(12) United States Patent
Nomura et al.

(10) Patent No.: US 6,507,716 B2
(45) Date of Patent: *Jan. 14, 2003

(54) IMAGE FORMING APPARATUS HAVING USER AND STORED JOB INDENTIFICATION AND ASSOCIATION CAPABILITY, A STORED JOB CONTENT DISPLAY AND MULTIPLE JOB TYPE IMAGE FORMING CONTROL DISPLAYS

(75) Inventors: Tatsuo Nomura, Souraku-gun (JP); Syoichiro Yoshiura, Ikoma-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/870,715

(22) Filed: May 30, 2001

(65) Prior Publication Data

US 2001/0048823 A1 Dec. 6, 2001

(30) Foreign Application Priority Data

May 30, 2000 (JP) ....................... 2000-159403

(51) Int. Cl.[7] .............................................. G03G 15/00
(52) U.S. Cl. .......................................... 399/80; 399/81
(58) Field of Search ............................. 399/80, 81, 85, 399/87

(56) References Cited

U.S. PATENT DOCUMENTS 4,708,461 A * 11/1987 Okuda et al. ................. 399/87
6,151,464 A * 11/2000 Nakamura et al. ........ 399/81 X

FOREIGN PATENT DOCUMENTS

| JP | 58-168059 | * 10/1983 |
| JP | 03025596 A | 2/1991 |
| JP | 3-96969 | * 4/1991 |
| JP | 9-106224 | * 4/1997 |

* cited by examiner

Primary Examiner—Fred L Braun
(74) Attorney, Agent, or Firm—Dike, Bronstein, Roberts & Cushman; David C. Conlin; David A. Tucker

(57) ABSTRACT

An image forming apparatus includes: an input portion for receiving different kinds of jobs; a storage portion for storing a job; an image forming portion for forming images of an input job; a control input portion for providing content display of input jobs and control display; a radiocommunication portion for reading the user identification ID recorded in an information recording medium; a controller for controlling these portions. With this configuration, the image forming apparatus determines the user identification ID of a user so as to provide a display of the operational state best for the user.

6 Claims, 7 Drawing Sheets

※ ——— : Control path
→ : Image information

Confidential print job list

| Job No. | User code | User name | Reception time | Number of copies | Paper |
|---------|-----------|-----------|----------------|------------------|-------|
| 001 | 11035 | Yamada | 11:30 | 3 | A4 |
| 002 | 10954 | Suzuki | 11:42 | 10 | A4 |
| 003 | 11236 | Tanaka | 11:55 | 5 | A4 |
| 004 | 10587 | Sato | 12:09 | 1 | B4 |
| 005 | 10954 | Suzuki | 13:11 | 1 | A3 |
| 006 | 11674 | Kato | 13:24 | 3 | A4 |
| ⋮ | ⋮ | ⋮ | ⋮ | ⋮ | ⋮ |

IMAGE FORMING APPARATUS HAVING USER AND STORED JOB INDENTIFICATION AND ASSOCIATION CAPABILITY, A STORED JOB CONTENT DISPLAY AND MULTIPLE JOB TYPE IMAGE FORMING CONTROL DISPLAYS

BACKGROUND OF THE INVENTION (1) Field of the Invention

The present invention relates to an image forming apparatus and control method thereof for performing predetermined image formation of multiple types of jobs input through job input means. The present invention is directed to an image forming apparatus which is called, for example, a digital multifunctional machine having the integrated functions of a copier, facsimile machine and scanner device and particularly being connected to a network so as to have the function of a printer for performing a printing job input via the network.

(2) Description of the Prior Art

As stated above, an image forming apparatus called a digital multifunctional machine has a copier function, printer function, facsimile function and scanner function, and is connected to terminal units such as personal computers etc., on a network and also connected to a telephone line.

Therefore, this image forming apparatus is equipped with a multiple number of job input means so that a multiple types of data such as document data, image data and other types of data can be exchanged with personal computers and facsimile machines or can be stored in the storage portion of the image forming apparatus and can be printed out as necessary.

Since various types of image forming jobs are effected in this image forming apparatus by multiple users, the apparatus is connected to terminal units such as personal computers so as to form a network such as a LAN. That is, image data and/or document data can be transmitted through the network so as to perform a printing job. This image forming apparatus may also be connected to a facsimile machine via the telephone line and perform a facsimile job by transmitting image data via the telephone line. Further, this machine scans original documents with its scanner device to perform a copying job.

Therefore, if various types of jobs are run in parallel from multiple users, images of different types of jobs are formed and output successively so that the formed images of different users come together. In addition to troublesome sorting being needed, there is a risk that the formed images may be lost or confidential content may be seen by others.

Further, if, while data of a print job is being transmitted from a terminal unit such as a personal computer etc., via the network, another user activates the scanner of the image forming apparatus to read documents and runs a large quantity of copying operations, there is a possibility that the execution of the print job will be held up. In this way, image forming apparatuses of this type, because of their multiplicity of functions, still have the problems about operativity, usefulness and job confidentiality.

SUMMARY OF THE INVENTION

The present invention has been devised in view of the above problems, it is therefore an object of the present invention to provide an image forming apparatus and its control method which can identify the individuality of the users who access the image forming apparatus and provide improved operativity for each user, by providing a control display in accordance with the type of a job if any reserved job for the user exists and which instantaneously produces images of the reserved job of the user to thereby assure the confidentiality and prevent the formed images from being lost.

It is another object of the present invention to improve the user operativity when a user has no reserved job in the image forming apparatus by providing a control display for the job type which is used most frequently.

It is a further object of the present invention to an image forming apparatus and its control method which, when a user having no reserved job accesses the image forming apparatus while there are reserved jobs of other users, prevents the reserved jobs of other users from being held up, by providing a control display for a job type which is used most frequently with the information of the jobs reserved by other users so as to enable the accessing user to consider if the copy job may take a long time or cause obstruction to the jobs of the other users.

In order to achieve the above objects, the image forming apparatus of the present invention includes: an input portion as input means for receiving different kinds of jobs; a storage portion as a storage means for storing a job with the user ID attached thereto; a radiocommunication portion as an identifying means for reading the user identification ID recorded in the information recording medium which a user accessing to the image forming apparatus holds; a controller as a determining means for determining whether the storage means is holding a job with the user identification ID of a user identified by the identifying means; and a control input portion for providing a control display.

Further detailed features of the present invention thus configured will be described as follows:

In accordance with the first aspect of the present invention, an image forming apparatus which stores a multiple number of image forming jobs in a storage means, performs predetermined image forming based on the image forming jobs, and has a control display portion for providing control display as to the jobs, includes:

an identifying means for identifying a user approaching the image forming apparatus; and a control means for controlling the control display in the control display portion based on the status of stored image forming jobs in the storage means and the user identification information of a user who has been identified by the identifying means.

In accordance with the second aspect of the present invention, the image forming apparatus having the above first feature is characterized in that the control means provides a standard control display if the storage means holds no job with the user identification information.

In accordance with the third aspect of the present invention, the image forming apparatus having the above first feature is characterized in that the control means provides a standard control display along with the content display of the jobs stored in the storage means if the storage means holds no job with the user identification information of a user approaching the image forming apparatus while there exist other jobs in the storage portion.

In accordance with the fourth aspect of the present invention, an image forming apparatus having a storage means for storing a multiple number of image forming jobs and providing control display in accordance with the type of each job, includes:

a storage means for storing a job and the user identification ID attached thereto;

an identifying means for identifying a user approaching the image forming apparatus;

a determining means for determining whether the storage means is holding a job with the user identification ID of a user identified by the identifying means; and a control means for providing a control display in accordance with the type of the job with the user identification ID of the user approaching the image forming apparatus when the storage means holds a job with the user identification ID.

In accordance with the fifth aspect of the present invention, the image forming apparatus having the above fourth feature is characterized in that the control means provides a standard control display if the storage means holds no job with the user identification ID.

In accordance with the sixth aspect of the present invention, the image forming apparatus having the above fourth feature is characterized in that the control means provides a standard control display along with the content display of the jobs stored in the storage means if the storage means holds no job with the user identification ID of a user approaching the image forming apparatus while there exist other jobs in the storage portion.

In accordance with the seventh aspect of the present invention, a control method for an image forming apparatus which stores a multiple number of image forming jobs in a storage means, performs predetermined image forming based on the image forming jobs and has a control display portion for providing control display as to the jobs, includes the steps of:

identifying a user approaching the image forming apparatus; and changing the display content of control display based on the status of stored image forming jobs in the storage means and the user identification information of a user who has been identified by the identifying means.

In accordance with the eighth aspect of the present invention, a control method for an image forming apparatus which has a storage means for storing a multiple number of image forming jobs and provides control display in accordance with the type of each job, includes the steps of: storing a job and a user identification ID attached to thereto;

identifying a user approaching the image forming apparatus;

determining whether the storage means is holding a job with the user identification ID of a user identified by the identifying means; and changing the display content of control display in accordance with the type of the job with the user identification ID of the user approaching the image forming apparatus when the storage means holds a job with the user identification ID.

In accordance with the ninth aspect of the present invention, the control method having the above eighth feature is characterized in that the display change is performed so that a standard control display is displayed if the storage means holds no job with the user identification ID.

In accordance with the tenth aspect of the present invention, the control method having the above eighth feature is characterized in that the display change is performed so that a standard control display along with the content display of the jobs stored in the storage means is displayed if the storage means holds no job with the user identification ID of a user approaching the image forming apparatus while there exist other jobs in the storage portion.

DESCRIPTION OF THE PREFERRED EMBODIMENT

The image forming apparatus and the control method thereof of the present invention will be described with reference to the accompanying drawings.

Figure 1:
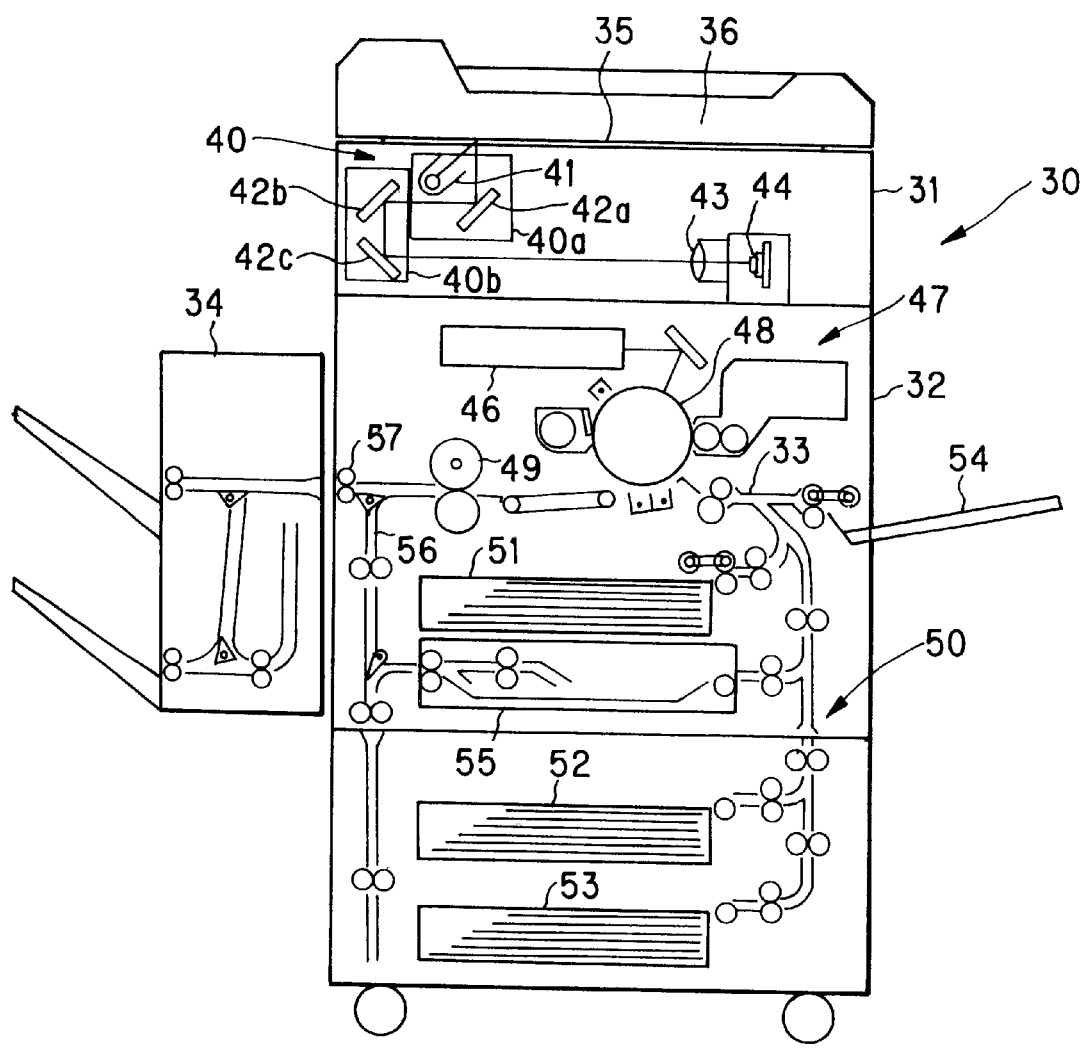
FIG. 1 is an overall view for illustrating the image forming means of an image forming apparatus in accordance with the present invention.

FIG. 1 is a sectional view of an image forming apparatus of the embodiment according to the present invention. First, with reference to FIG. 1, the mechanism of image forming will be described taking a copy job as an example.

As shown in this figure, this image forming apparatus 30 is mainly composed of a scanner portion (image reading means/input means) 31 and an image forming portion (image forming means) 32.

Scanner portion 31 includes: an original table 35 of transparent glass: a reversing automatic document feeder (RADF) 36 for conveying and feeding originals automatically onto original table 35; and an image original reading unit, i.e., scanner unit 40 for reading by scanning the image of the original placed on original table 35.

The RADF 36 is a device which has a number of documents placed at a time on its document tray (not shown) so that the set documents are automatically fed one by one onto document table 35 of the scanner unit. In order for the scanner unit to read one side or both sides of original documents in accordance with the operator choice, this RADF 36 is comprised of a one-sided document feed path, a dual-sided document feed path, a feed path switching means for switching the feed from one to the other, a group of sensors for detecting and managing the state of the document passing through the different positions, a controller and the like.

Scanner unit 40 as a part of scanner portion 31 for reading the image of an original on the original table 35 includes: a lamp reflector assembly 41 for exposure of the document surface; a first scan unit 40a provided with a first reflection mirror 42a for directing the light reflected from the original; a second scan unit 40b provided with second and third reflection mirrors 42b and 42c for directing the reflected light image from first reflection mirror 42a toward a photoelectric transducer (CCD); an optical lens 43 for focusing the light reflected from the original and passing through the above reflection mirrors onto the device (CCD) for converting the light into electric image signals; and the CCD 44 for converting the reflected light image from the original into electric image signals.

As the originals to be read are successively placed onto original table 35 in association with the actions of RADF 36 and scanner unit 40, scanner portion 31 reads the original image by moving scanner unit 40 along the undersurface of original table 35.

More illustratively, first scan unit 40a travels at a constant speed V from the left to right along the original table while second scan unit 40b is controlled so as to travel parallel to and in the same direction as the first scan unit at a speed of V/2.

With this operation, the image of the original placed on original table 35 is focused on and successively read linewise by CCD 44.

The image data obtained by scanner unit 40 by picking up the original image is sent to an aftermentioned image processor, where the data is subjected to various processes. Then the processed image data is temporarily stored in the memory. As an output instruction is issued, the image data is loaded from the memory and transferred to image forming portion 32, whereby an image is formed on the paper (recording sheet).

This image forming portion 32 includes a paper conveying mechanism as a system for conveying sheets on which images are formed, a laser writing unit 46 and an electrophotographic processing portion 48 for forming images.

Laser writing unit 46 includes: a semiconductor laser source for emitting laser beams in accordance with the image data captured by the aforementioned scanner unit 40 and loaded from the memory or the image data transferred from another external device; a polygon mirror for deflecting the laser beam at an equiangular speed; and an f-theta lens for correcting the laser beam deflected at an equiangular speed so that the laser spot focused on the photosensitive drum surface of electrophotographic processing portion 48 will move at a constant speed.

As is well known, electrophotographic processing portion 48 includes: a charger, developing unit, transfer unit, separating unit, cleaning unit, erasing unit, all being arranged around the photosensitive drum.

The sheet conveying mechanism is comprised of a conveying portion for conveying the sheet to the electrophotographic processing portion for performing image forming, especially the transfer station where the transfer unit is arranged, paper feed trays (cassette feeders) 51, 52 and 53 or a manual bypass paper feeder 54 allowing a sheet of a necessary size to be fed as appropriate for conveying the sheet to the conveying portion 33, a fixing unit 49 for fixing the toner image formed on the sheet after transfer, and re-feeding paths 55 and 56 for again feeding the sheet, after fixing, to form another image on the underside of the sheet.

Provided on the downstream side of fixing unit 49 is a paper output tray/post-processing unit 34 as a receiving means for receiving the sheets with images recorded thereon and subjects the sheets to necessary post-processes.

Concerning laser writing unit 46 and electrophotographic processing portion 48, the image data loaded from the image memory is supplied to laser writing unit 46, which scans the laser beam being modulated based on the image data to create a static latent image on the photosensitive drum surface. This latent image is developed with the toner into a toner image, which is electrostatically transferred and fixed to the paper being conveyed from one of paper feeders in the multi-layered paper feed unit.

The sheet with an image thus formed thereon is conveyed from fixing unit 49 into paper output tray/post-processing unit 34 by way of discharge rollers 57, and received in the receiving means after post-processing.

Next, the functional configuration of the image forming apparatus of the present invention will be described.

Figure 2:
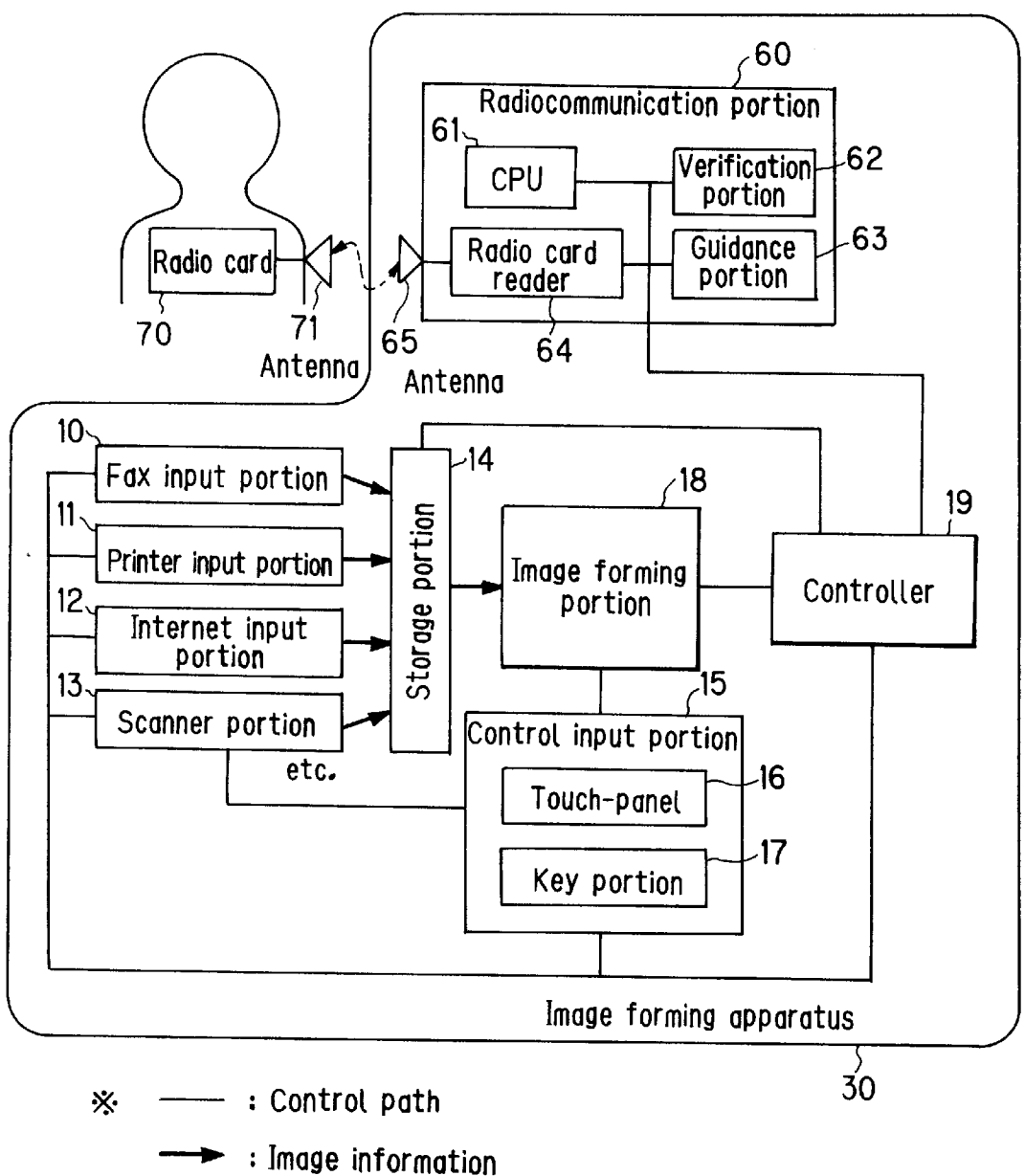
FIG. 2 is a block diagram showing the functional configuration of an image forming apparatus in accordance with the present invention.

As shown in FIG. 2, image forming apparatus 30 includes four job input portions, a storage portion 14 for storing input Jobs, a control input portion 15 for the operational instructions of image forming apparatus 30, an image forming portion 18 for performing image formation of jobs, a radio communication portion 60 and a controller 19 for controlling these portions. Control input portion 15 is comprised of a touch panel display 16 also serving as a display means (only shown as touch panel in FIG. 2) and key portion 17. Radio communication portion 60 is adapted to exchange user identification ID with a radio card 70 via antennas 65 and 71.

The above job input portions include a fax input portion 10 for receiving the image data sent from a facsimile machine, a printer input portion 11 for receiving image data and document data from computers, an internet input portion 12 for receiving image data via the internet and a scanner portion 13 for reading image data from documents.

Figure 3:
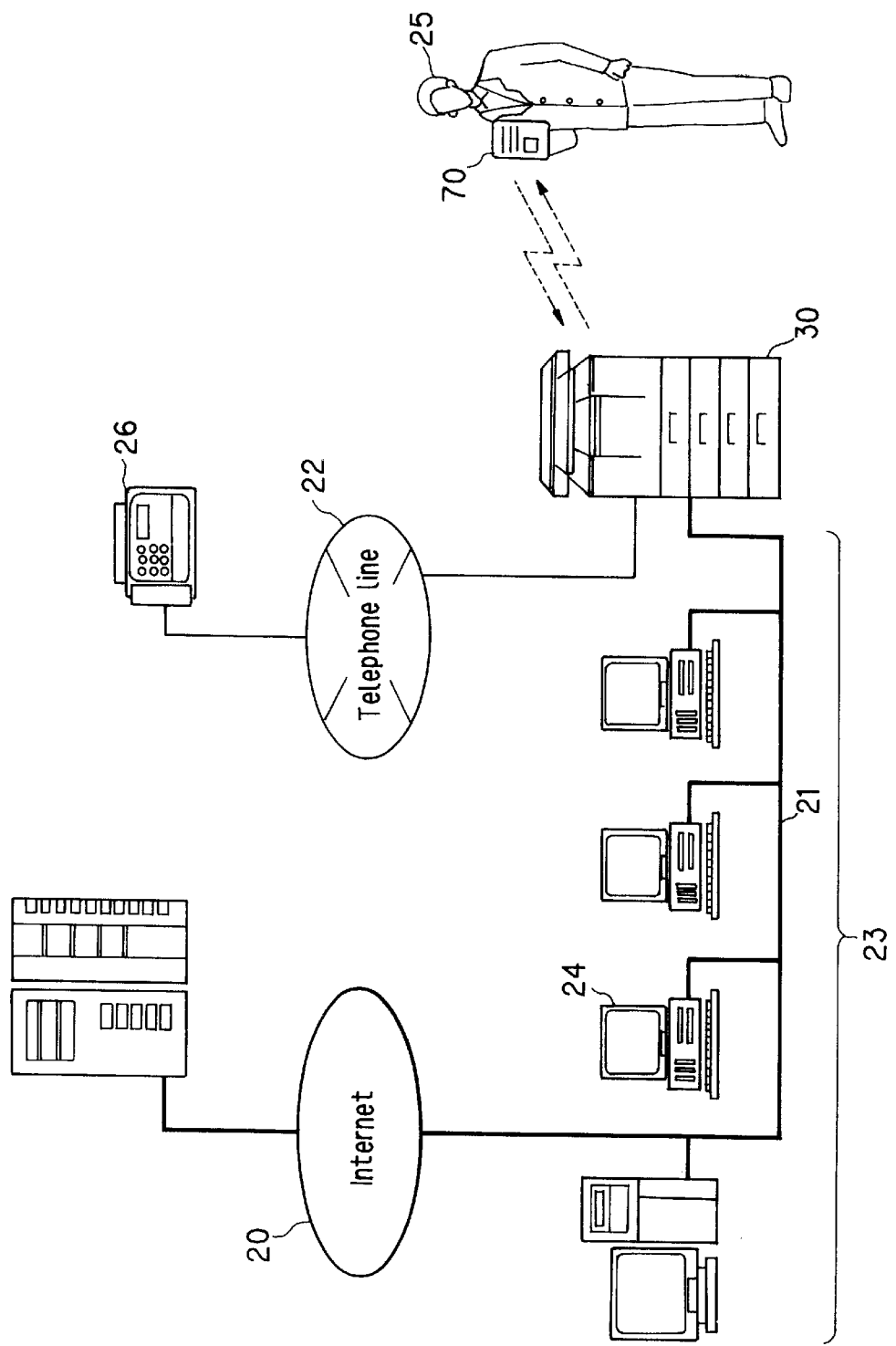
FIG. 3 is a conceptual view for illustrating the use of an image forming apparatus according to the present invention connected on a network.

FIG. 3 is a conceptual view illustrating the use of an image forming apparatus according to the present invention.

As shown in FIG. 3, image forming apparatus 30 is connected to a network 23 including the internet, designated at 20, a LAN 21, telephone line 22. LAN 21 has multiple personal computers 24 connected to the aforementioned printer input portion 11. Internet 20 is connected to internet input portion 12 via LAN 21 but may be connected directly, and not via LAN 21. Telephone line 22 is connected to the aforementioned fax input portion 10. The scanner portion is provided for image forming apparatus 30, as stated already. Image forming apparatus 30, based on the jobs input through the above input portions, performs the image forming operation as illustrated with reference to FIG. 1. As shown in FIG. 2, radiocommunication portion 60 exchanges the user identification ID with radio cards 70 owned by users 25 who use image forming apparatus 30.

The user identification ID recorded on this radio card 70 contains a unique user code. That is, radio communication portion 60 makes radio communication with the radio card 70 as an information recording medium, and identifies the holder of the radio card 70 based on their user code.

Radiocommunication portion 60 is comprised of a radio-communication portion CPU 61 for controlling the devices in the radiocommunication portion, radio card reader 64 for reading the user identification ID recorded on each radio card 70, a verification portion 62 for verifying the user identification ID of the radio card 70 read by radio card reader 64 with the user identification IDs attached to the input jobs, and a guidance portion 63 for providing various guidance with electronic sounds or voices to the user.

Figure 4:
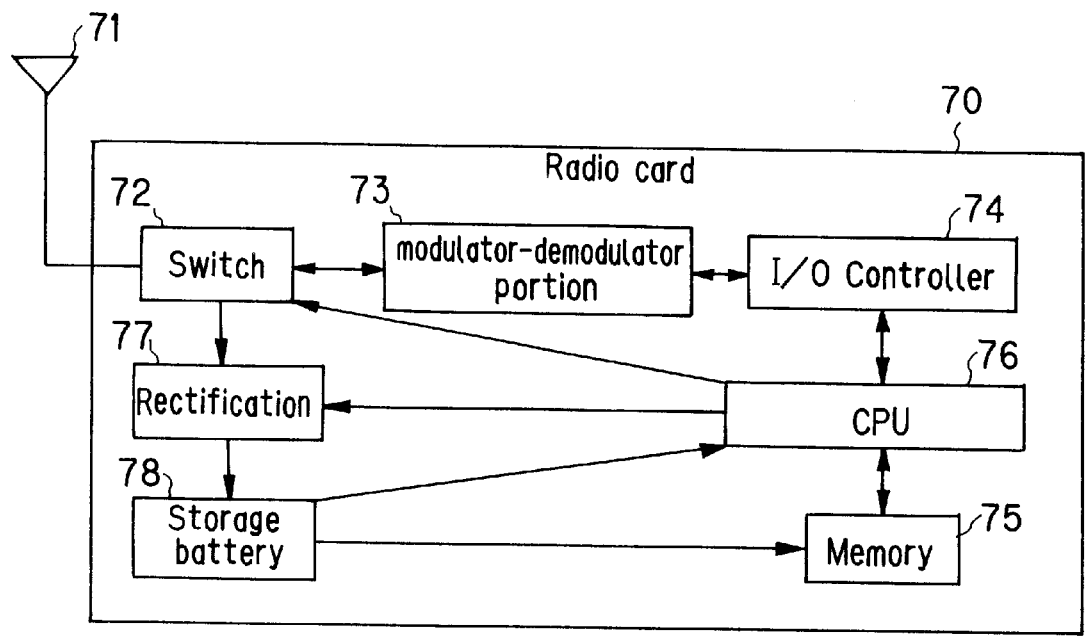
FIG. 4 is a block diagram for illustrating a radio card.

As shown in FIG. 4, radio card 70 is comprised of an antenna 71, switch 72, modulator-demodulator portion 73, I/O controller 74, memory 75, CPU 76, rectifier 77 (shown as rectification in FIG. 4), storage battery 78 and the like. Among these, the parts other than storage battery 78 are integrated into a microchip and embedded in the radio card 70 body. Antenna 71 exchanges signals with radio card reader 64 by sending and receiving electromagnetic waves. Switch 72 is controlled by CPU 76 so as to selectively connect antenna 71 to either modulator-demodulator portion 73 or rectifier 77. Modulator-demodulator portion 73 modulates sending signals and demodulates and converts the received signals into defined data. Memory 75 is used to store various types of data, e.g., user identification ID, other user data. CPU 76 controls each part and performs various data processing. Rectifier 77 rectifies the recharging electromagnetic waves via antenna 71 and converts them into electric energy, which is supplied to recharge storage battery 78. This storage battery 78 is rechargeable and serves as an operational power source for supplying operating voltages to the necessary parts.

Figure 5:
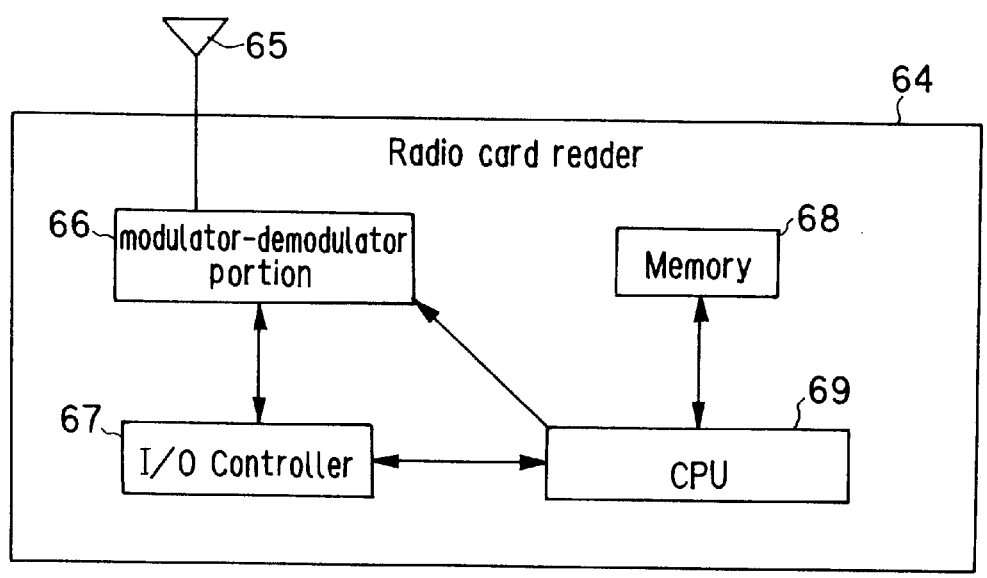
FIG. 5 is a block diagram for illustrating the functional configuration of a radio card.

Radio card reader 64, as shown in FIG. 5, is comprised of an antenna 65, modulator-demodulator portion 66, I/O controller 67, memory 68, CPU 69 and the like.

Antenna 65 exchanges signals such as user identification ID with the aforementioned radio card 70 by sending and receiving electromagnetic waves. Modulator-demodulator portion 66 modulates sending signals and demodulates the received signals. I/O controller 67 converts the data to be sent into defined signals and converts the demodulated received signals into defined data. Memory 68 is used to store various types of data. CPU 69 governs the total control.

Figure 6:
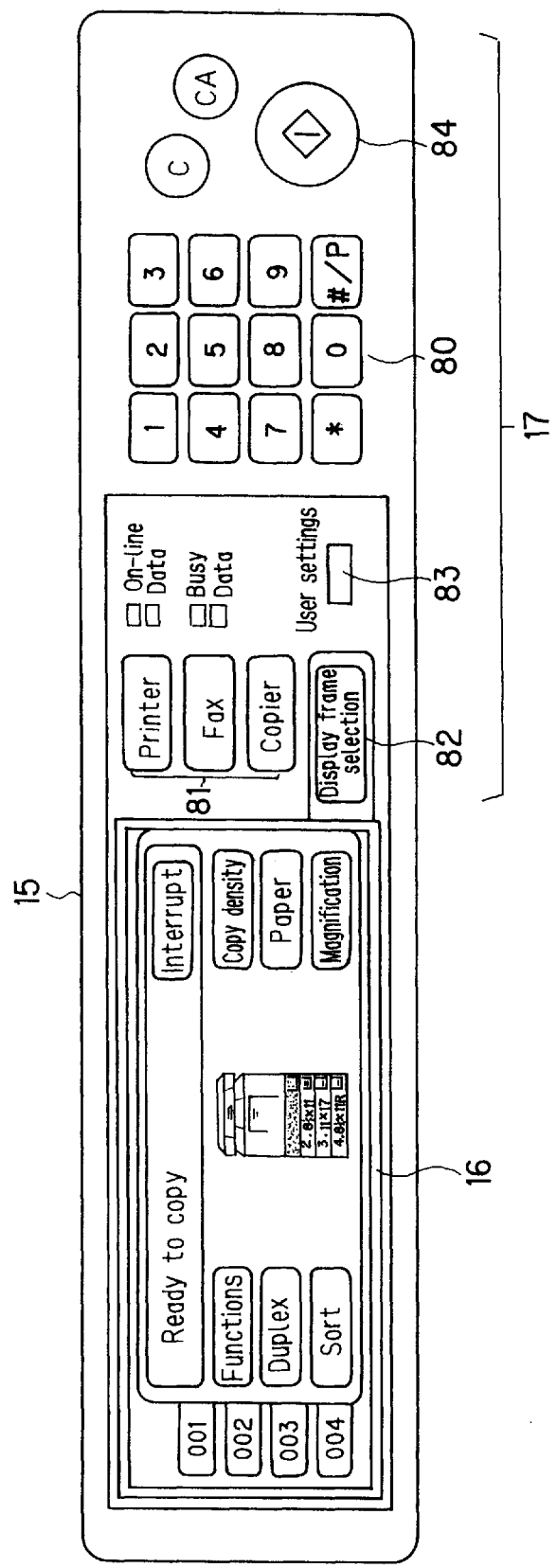
FIG. 6 is a view showing the configuration of a control display panel.

As shown in FIG. 6, control input portion 15 has a numeric keypad 80, mode selection keys 81, display frame selection key 82, user setup key 83, start key 84 and the like in the key portion, designated at 17. This control input portion further has a touch-panel display 16 which serves for both control input and display. It should be noted that the display device is not limited to a touch-panel type display.

Next, in the image forming apparatus of the present invention, the changes in the control display in accordance with the type of the input job will be described.

(Step for Issuing a User Identification ID for Each Input Job)

Document data prepared with document composition software operating on a personal computer 24 shown in FIG. 3 is sent as a print job from the personal computer 24 to image forming apparatus 30 via LAN 21. In this operation, the printer driver installed in personal computer 24 issues a user identification ID for the print job. This user identification ID contains information such as user code, user name, the number of printout copies, paper size, etc. This may also include instructions that image forming be performed as soon as the job is input.

(Job Input Step)

The print job transmitted from personal computer 24 is input to image forming apparatus 30 through printer input portion 11 shown in FIG. 2 and stored in storage portion 14. A facsimile job sent from a facsimile 26 which is connected to image forming apparatus 30 via telephone line 22 as shown in FIG. 3 is input to image forming apparatus 30 through facsimile input portion 10 shown in FIG. 2 and stored in storage portion 14.

Figures 7, 8:
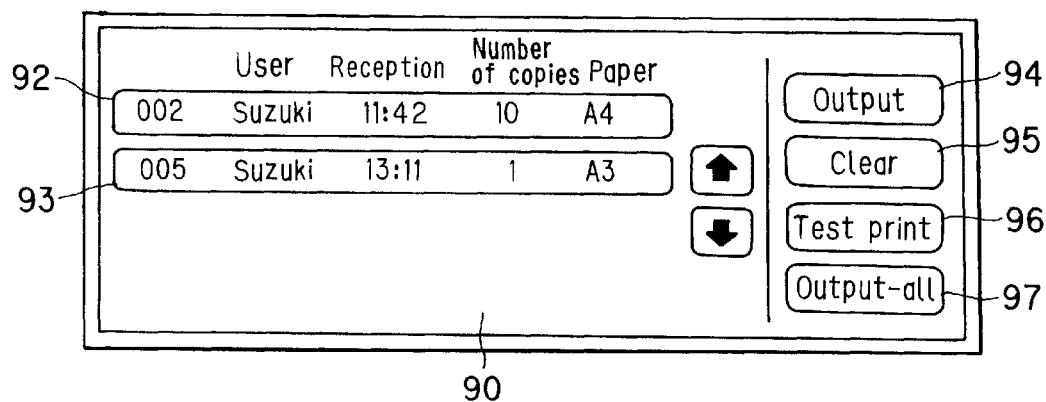
FIG. 7 is an illustrative chart showing the jobs input to the image forming apparatus being stored in the storage portion.
FIG. 8 is a display example when the storage portion holds reserved jobs of a user accessing the image forming apparatus.

When a job is stored in storage portion 14, controller 19 creates a confidential print job list shown in FIG. 7 to manage it. This job list indicates the job number allotted to each job input to image forming apparatus 30 and the reception time, the user code, user name, number of copies, number of printouts, paper size, contained in the user identification ID of the input job. These are handled as management data. For example, the user code is used to verify the unique user code contained in the user identification code recorded in radio card 70. The management items such as number of copies and number of printouts can be used to make an operational control such as offering priority for a job with a lower number of copies and a lower number of printouts.

(User Identification Step)

User 25 shown in FIG. 3 who orders the print job from personal computer 24 owns a radio card 70 with a user identification ID recorded thereon. The user identification ID recorded on this radio card 70 has a unique user code. When the user 25 approaches image forming apparatus 30, radiocommunication portion 60 shown in FIG. 2 makes communication with radio card 70 to acquire the user identification ID stored in the radio card 70.

The user code of the acquired user identification ID is transferred from radiocommunication portion 60 to controller 19. At this point, controller 19, based on the confidential print job list prepared by controller 19 and shown in FIG. 7, checks whether any job with that user code exists in storage portion 14.

(Control Display Switching Step)

When it is found that jobs with the user code obtained at the user identification step exist in storage portion 14 based on the above confidential print job list prepared by controller 19 and shown in FIG. 7, controller 19 shown in FIG. 2 causes touch-panel display 16 in control input portion 15 shown in FIG. 6 to display the control display shown in FIG. 8. In this way, when the user 25 shown in FIG. 3 has arrived at the site of image forming apparatus 30, the image forming operation of the reserved jobs can be performed easily and promptly.

Figure 11:
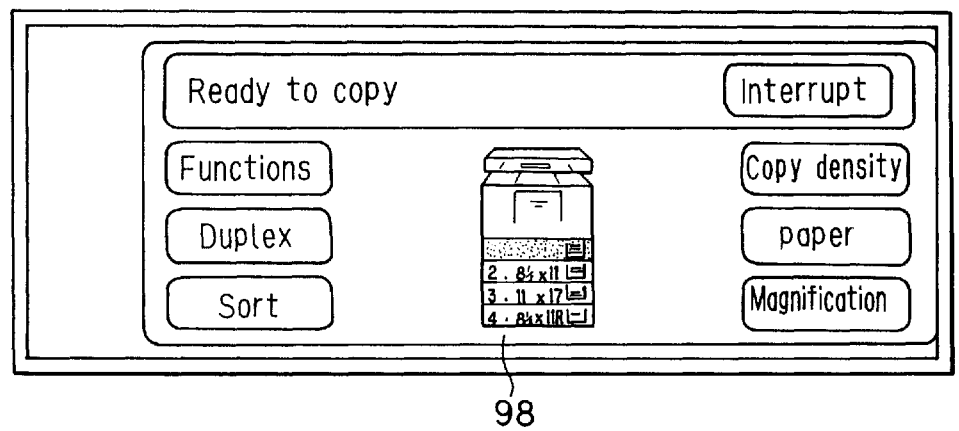
FIG. 11 is a display example when no reserved job exists in the image forming apparatus.

When it is found that no job with the user identification ID exists in storage portion 14 based on the above confidential print job list prepared by controller 19 and shown in FIG. 7, controller 19 causes touch-panel display 16 in control input portion 15 to display the control display shown in FIG. 11. This allows the user to make easy and quick control in an operation mode, such as copier mode, which is frequently used.

Figure 9:
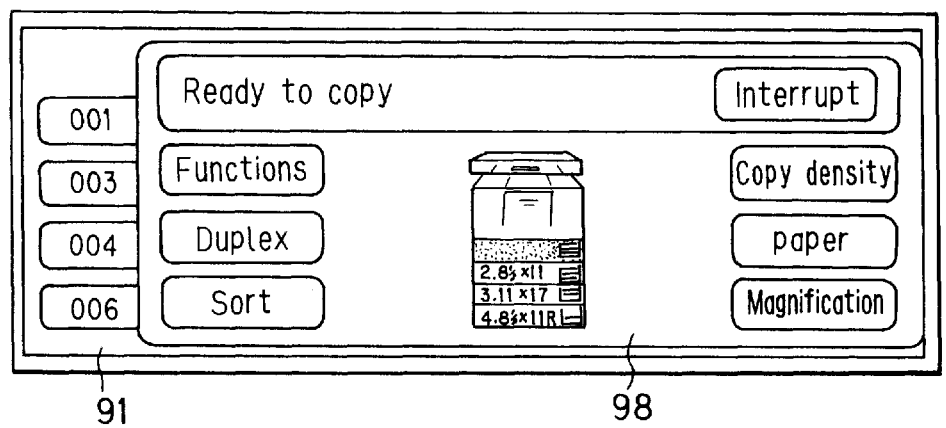
FIG. 9 is a display example when the storage portion holds reserved jobs of users other than the person accessing the image forming apparatus.

When it is found that no job with the user code obtained at the user identification step exists but there exist other jobs in storage portion 14 based on the above confidential print job list prepared by controller 19 and shown in FIG. 7, the controller causes touch-panel display 16 in control input portion 15 to display the control display shown in FIG. 9. This configuration provides guidance display showing the extent of the amount of jobs which have been reserved up to that point, so as to let the user decide whether a large quantity of copies should be carried out or not, to prevent the reserved jobs from being held up.

Next, the contents of control display in accordance with the types of input jobs in the image forming apparatus of the present invention will be described.

The display content shown in FIG. 8, i.e., the display content 90 shows the jobs with the specific user code, which has been identified by image forming apparatus 30 when a user 25 shown in FIG. 3 approaches image forming apparatus 30. This content display 90 displays only the jobs corresponding to the user code, among the jobs in the confidential print job list shown in FIG. 7. The items displayed include the job number of jobs accepted by image forming apparatus 30, user name, reception time, number of printout copies and paper size. In this display, touching the job key 92 with a finger makes it possible to designate the job to be image formed. Then, when touching an output button 94 it is possible to start the image forming of the selected job 92. If the selection needs to be cancelled, the clear button designated at 95 may be touched. When printing a job with a large number of sets it is possible to print out one set of copies by touching the test button after selection of the job. Touching an output-all key 97 starts image forming of all the jobs being displayed.

Figure 10:
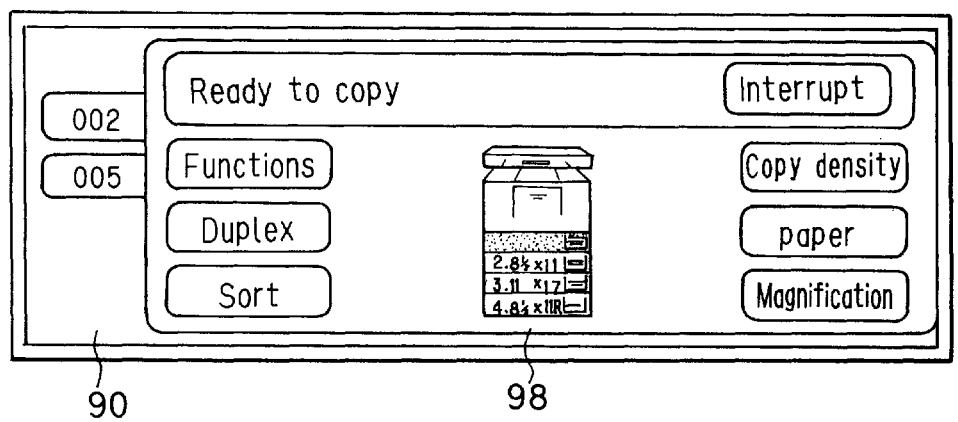
FIG. 10 is a display example in which the reserved jobs of a user accessing the image forming apparatus and the control frame of the copy mode are displayed simultaneously.

The control display can be changed by operating one of mode selection keys 81 in control input portion 15 shown in FIG. 6. When the copy mode key is touched, a control display 98 for the copier function is displayed in the same frame as shown in FIG. 10. With this display, when the start key, designated at 84 shown in FIG. 6, is pressed, it is possible to start the copier function, i.e., cause scanner portion 13 shown in FIG. 2 to scan documents.

FIG. 9 shows a case where no job with the user code identified by image forming apparatus 30 exists in storage portion 14 shown in FIG. 2 when a user 25 shown in FIG. 3 approaches the image forming apparatus 30 but there exist jobs of other users in storage portion 14. That is, the display for indicating the above case is displayed as a content display 91 while control display 98 for the copy function which is most frequently used in image forming apparatus 30 is displayed in the same frame. With this display frame, touching content display 91 makes it display in the foreground so as to allow the user to check the contents of the reserved jobs in image forming apparatus 30. Content display 91 is displayed based on the confidential print job list shown in FIG. 7. The details of the content are the same as in FIG. 8. Content display 91 is displayed so that the job numbers can be seen at the left side when control display 98 is displayed in the foreground. When control display 98 is displayed in the foreground, the copier function is set active. That is, when start key 84 shown in FIG. 6 is pressed, it is possible to start the copier function, or cause scanner portion 13 shown in FIG. 2 to scan documents.

FIG. 11 shows a control display where no job regardless of user codes exists in storage portion 14 shown in FIG. 2 when a user 25 shown in FIG. 3 approaches the image forming apparatus 30. In this figure, though the copier function which is used most frequently in image forming apparatus 30 is displayed as a standard control display, the setting of the control display can be changed by pressing user setup key 83 shown in FIG. 6 so that the control state of another function, e.g., facsimile will be displayed and made active.

In the display shown in FIG. 8 or 9, though the jobs are shown with the job numbers allotted by image forming apparatus 30, these jobs may be shown with icons representing their functional modes depending upon the job types, such as printer mode, facsimile mode, etc. Further, the operational state in image forming apparatus 30 may be changed by pressing one of mode selection keys 81 in control input portion 15 shown in FIG. 6, or the display content may be changed by pressing display frame selection key 82.

As has been described heretofore, according to the image forming apparatus of the present invention, since each of the users who have access to the image forming apparatus can be identified, it is possible for the image forming apparatus to provide improved operativity for each user, by its providing a control display in accordance with the type of a job if any reserved job for a specific user exists. Further, since the reserved job of a user can be image formed in accordance with the user's instruction through the control display, it is possible to assure the confidentiality of the job and prevent the formed images from being lost.

Since the image forming apparatus of the present invention provides a control display for the job type which is used most frequently if a user has no reserved job in the image forming apparatus, it is possible to improve the user operativity.

In the image forming apparatus of the present invention, when a user having no reserved job accesses the image forming apparatus while there are reserved jobs of other users, the jobs of other users are prevented from being held up, by providing, in addition to a control display for a job type which is used most frequently, the information of the jobs reserved by other users so as to enable the user having access to consider whether the copy job may take a long time or cause any obstruction of the jobs of the other users.

What is claimed is:

1. An image forming apparatus which stores a multiple number of image forming jobs in a storage means, performs predetermined image forming based on the image forming jobs, and has a control display portion for providing control display as to the jobs, comprising:

an identifying means for identifying distinctive user identification information of a user approaching the image forming apparatus; and a control means for controlling the control display in the control display portion based on the status of stored image forming jobs in the storage means and the distinctive user identification information of a user who has been identified by the identifying means.

2. The image forming apparatus according to claim 1, wherein the control means provides a standard control display if the storage means holds no job having the distinctive identification information of an identified user associated therewith.

3. The image forming apparatus according to claim 1, wherein the control means provides a standard control display along with the content display of the jobs stored in the storage means if the storage means holds no job having the distinctive identification information of an identified user associated therewith while there exist other jobs in the storage means.

4. An image forming apparatus having a storage means for storing a multiple number of image forming jobs and providing a control display in accordance with the type of each job, comprising:

a storage means for storing a job and distinctive user identification information associated therewith;

an identifying means for recognizing distinctive user identification information of a user approaching the image forming apparatus;

a determining means for determining whether the storage means is holding a job with distinctive user identification information associated therewith that is the same as the distinctive user identification information of a user identified by the identifying means; and a control means for providing a control display in accordance with the type of the job having distinctive user identification information associated therewith that is the same as the distinctive user identification information of a user approaching the image forming apparatus when the storage means holds a job with the distinctive user indentification information associated therewith.

5. The image forming apparatus according to claim 4, wherein the control means provides a standard control display if the storage means holds no job having the distinctive identification information of the user associated therewith.

6. The image forming apparatus according to claim 4, wherein the control means provides a standard control display along with the content display of the jobs stored in the storage means if the storage means holds no job having the distinctive identification information of an identified user associated therewith while there exist other jobs in the storage means.

* * * * *